United States Patent [19]

Speaight et al.

[11] 4,228,727
[45] Oct. 21, 1980

[54] PISTONS

[75] Inventors: David C. Speaight; Gerald Longfoot, Lymington, England

[73] Assignee: Wellworthy Limited, Lymington, England

[21] Appl. No.: 882,778

[22] Filed: Mar. 2, 1978

[30] Foreign Application Priority Data

Mar. 21, 1977 [GB] United Kingdom ............... 11873/77

[51] Int. Cl.³ ................................................ F16J 1/00
[52] U.S. Cl. ................................ 92/228; 29/156.5 R; 92/230
[58] Field of Search ................. 92/222, 228, 229, 230, 92/239, 220; 123/193 P; 29/156.5 R, 527.4

[56] References Cited

U.S. PATENT DOCUMENTS

| | | | |
|---|---|---|---|
| 1,306,839 | 6/1919 | Schneider | 92/220 X |
| 1,465,144 | 8/1923 | Nelson | 92/228 |
| 2,801,890 | 8/1957 | Nitsch | 92/230 |
| 3,385,175 | 5/1968 | Meier et al. | 92/222 X |
| 3,908,521 | 9/1975 | Cockcroft | 92/228 |
| 4,073,221 | 2/1978 | Goloff | 92/220 X |

FOREIGN PATENT DOCUMENTS 2351166  4/1974  Fed. Rep. of Germany ....... 123/193 P Primary Examiner—Irwin C. Cohen
Attorney, Agent, or Firm—Biebel, French & Nauman

[57] ABSTRACT

A cast light metal piston has a plurality of longitudinally extending reinforcing members. These reinforcing members may be disposed at predetermined positions in the piston as cast and are designed to impart a compressive stress to the material of the piston in the regions where the reinforcing members are located. Conveniently, the reinforcing members may be located adjacent the opposite sides of each of a pair of gudgeon pin holes provided in the skirt of the piston.

1 Claim, 7 Drawing Figures

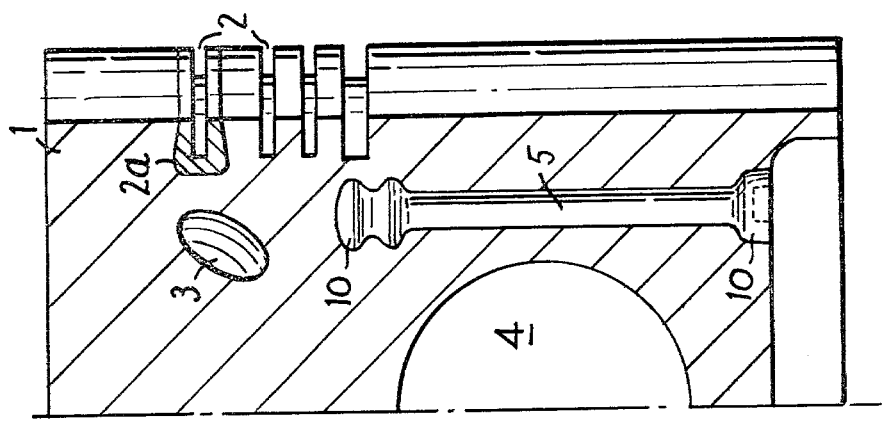
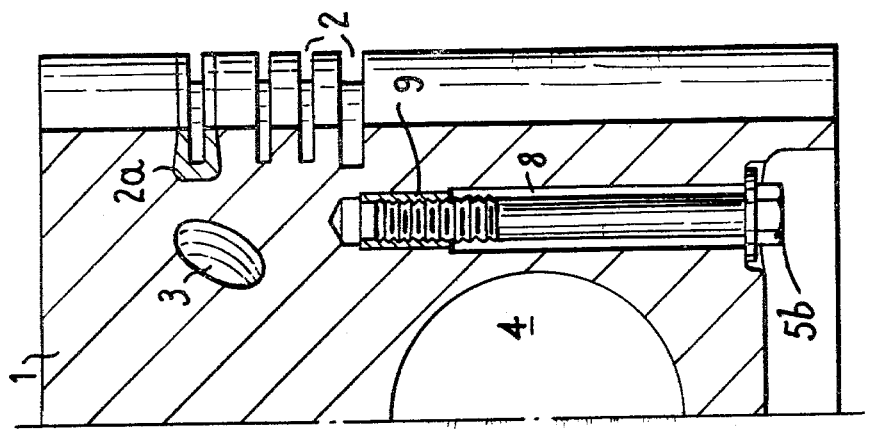

PISTONS

BACKGROUND OF THE INVENTION

The present invention relates to pistons for internal combustion engines and more particularly to light metal pistons, for example aluminium or aluminium alloy pistons.

In the design and nanufacture of pistons for internal combustion engines, a great deal of care is taken to provide sufficient running clearances for the pistons under all forseeable engine operating conditions and in particular arrangements are made for adequate cooling and lubrication of the piston during its operation. Nevertheless, failure of the cooling or lubrication facilities, or the malfunction of some other component, may still result in seizure of a piston in an engine. Particularly in cases such as high speed marine engines or in locomotives, where the engines have a large number of cylinders and the operator or driver is situated remote from the engine compartment, in the event of seizure of a piston the engine may continue to run on full power from the remaining cylinders until the seized piston and/or the associated cylinder liner is largely broken up, resulting in very serious damage to the engine.

In order to reduce the possibility of such damage resulting from piston seizure, particularly in the types of situations mentioned above, it has been proposed to employ forged aluminium pistons since they have a greater ductility than cast pistons and therefore a forged material can be said to lessen the danger of piston breakage before an engine can be stopped in the case of some failure, such as in the cooling or lubrication systems. However, when designing an engine it is not always possible to meet the requirements for wear-resistance and adequate piston cooling where forged pistons are employed.

It is accordingly an object of the present invention to provide improved constructions of cast light metal piston.

SUMMARY OF THE INVENTION

From one aspect the invention provides a cast light metal piston wherein said piston includes a plurality of longitudinally extending reinforcing members. The members may be embedded in the piston as cast or otherwise located in the cast metal of the piston.

From another aspect, the invention provides a cast light metal piston having a plurality of longitudinally extending reinforcing members disposed at predetermined positions in the piston as cast and which are designed to impart a compressive stress to the material of the piston in the regions where the reinforcing members are located.

Advantageously, reinforcing members are located adjacent the opposite sides of each gudgeon pin hole provided in the skirt of the piston. If desired, a single reinforcing member in the form of a hoop may be provided for each gudgeon pin hole, the limbs of the hoop extending longitudinally of the piston and the top of the hoop extending over the gudgeon pin hole, i.e. on the side adjacent the piston crown.

In a further construction, the ends of the reinforcing members situated towards the crown of the piston are connected together by means of a generally ring-shaped member, which services to give support to the thrust faces of the piston.

The reinforcing members may be in the form of bolts embedded in the cast material of the piston with their heads located towards the crown of the piston and their lower threaded ends projecting at the bottom of the piston. Nuts are fitted on these threaded ends so that a predetermined torque can be applied to the bolts by tightening of the nuts and thus a controlled amount of compressive stress can be provided. Alternatively, the bolts may be fitted into threaded sockets located in bores which are machined in the material of the piston after it has been cast.

In a further construction the reinforcing members are each in the form of a rod or pin having an enlargement at either end and embedded in the cast material of the piston. The degree of compressive stress provided results from the expansion of the cast material of the piston at its working temperature.

BRIEF DESCRIPTION OF THE DRAWINGS

The invention will now be further described, by way of example, with reference to the accompanying drawings in which.

DETAILED DESCRIPTION OF THE INVENTION

Figure 1:
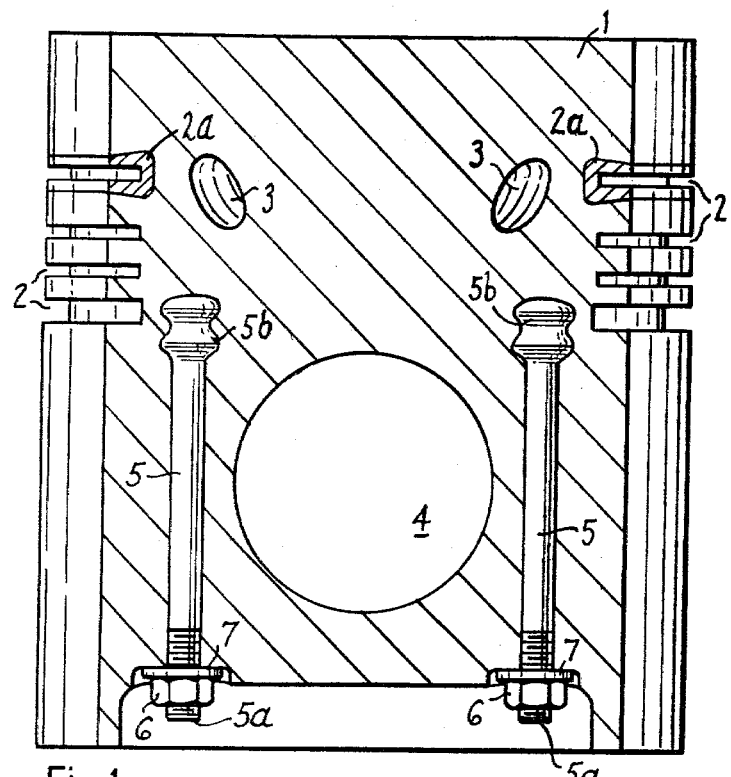
FIG. 1 is a longitudinal section, taken on line I—I in FIG. 2, through one embodiment of piston according to the invention.
Figure 2:
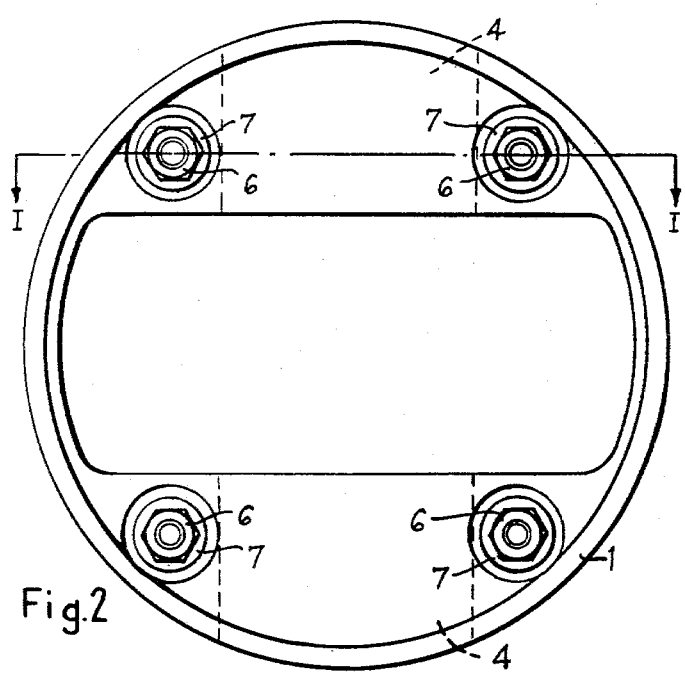
FIG. 2 is an underneath plan view of the piston in FIG. 1, FIGS. 3a and 3b show modifications of the embodiment of piston in FIG. 1.

Referring to FIGS. 1 and 2, an aluminum alloy piston generally indicated at 1 is provided with a plurality of ring grooves 2, an oil cooling gallery 3 and gudgeon pin holes 4. One or more of the ring grooves may be provided with a wear-resistant insert as shown at 2a. A reinforcing member 5 is arranged at either side of each gudgeon pin hole 4 and extends longitudinally of the piston with one end 5a projecting at the lower end of the piston, but within the confines of the piston shirt. The reinforcing members are located in the piston mould prior to casting of the aluminium alloy so that they are embedded in the piston as cast. Each reinforcing member is in the form of a high tensile steel bolt having an enlarged head 5b at its inner end and being threaded at least at its lower end 5a to receive a nut 6, which may be backed by a washer 7. By applying a predetermined torque to the nuts 6 on the lower ends of the casting reinforcing bolts 5, a controlled amount of compressive stress can be provided in the cast body of the piston.

FIG. 3a shows a modified arrangement wherein the bolts are fitted after the piston has been cast, by machining bores 8 in the material of the piston and screwing the threaded ends of the bolts into threaded inserts 9 secured in the bores 8. The compressive stress exerted is controlled by tightening the bolts.

FIG. 3b shows a further modified arrangement wherein the cast-in reinforcing members 5 consist of high tensile steel pins or bars having an enlarged head 10 at each end, one of the heads being located adjacent to the lower end of the piston. In this construction the compressive stress imparted to the reinforcing members results from the expansion of the aluminium alloy of the piston at its working temperature in the engine.

Figure 4:
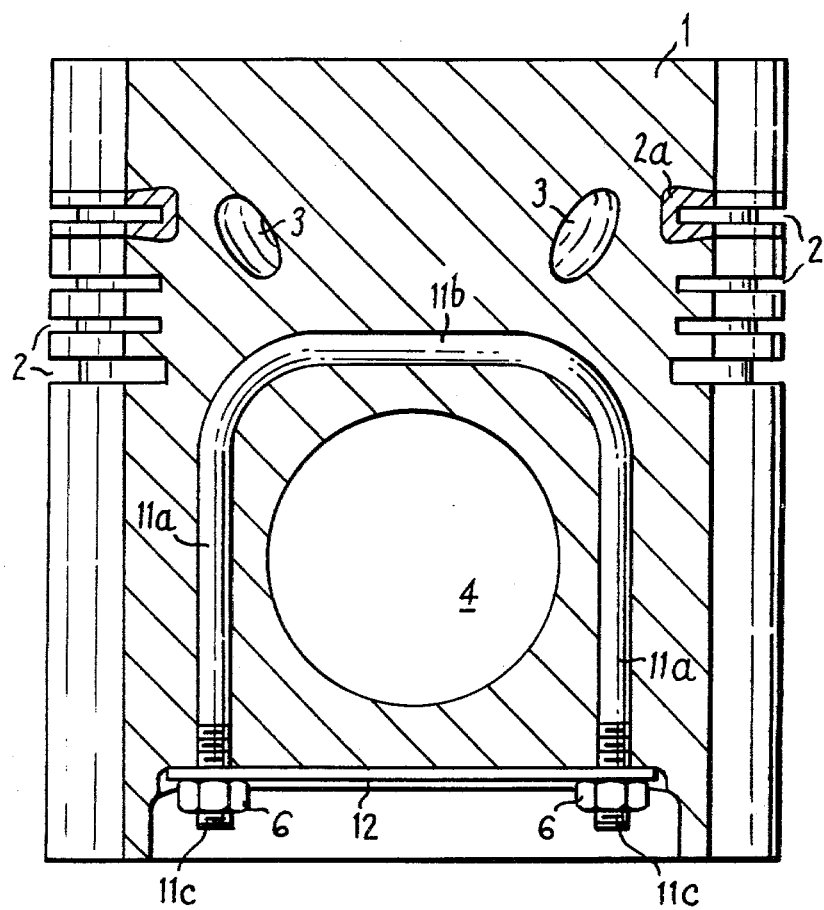
FIG. 4 shows a further embodiment of piston according to the invention.

FIG. 4 shows a further arrangement wherein the cast-in reinforcing member associated with each gudgeon pin hole is in the form of a hoop or U-bolt of high tensile steel having limbs 11a extending longitudinally of the piston at either side of the gudgeon pin hole, whilst the bridge 11b of the hoop or U-bolt forms a reinforcement across the top of the gudgeon pin hole. Each limb 11a terminates in a projecting threaded end 11c on which is fitted a nut 6. The nuts are tightened to exert the desired compressive stress on the limbs 11a under the nuts 6. Such a construction imparts greater hoop strength around the bearing surface of the gudgeon pin hole and tends to reduce the likelihood of vertical cracking through the gudgeon pin bearing surface.

Figure 5:
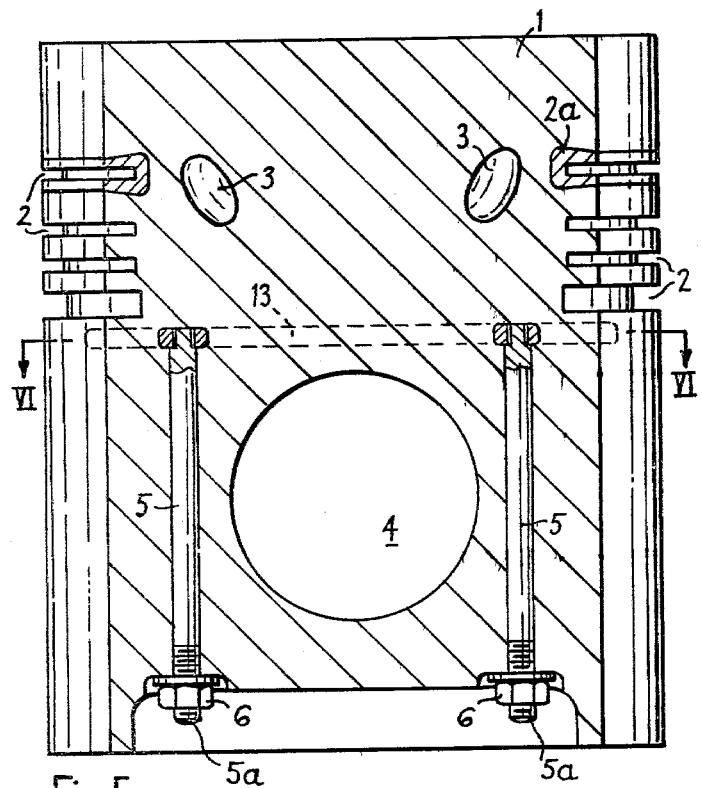
FIG. 5 shows another embodiment of piston according to the invention.
Figure 6:
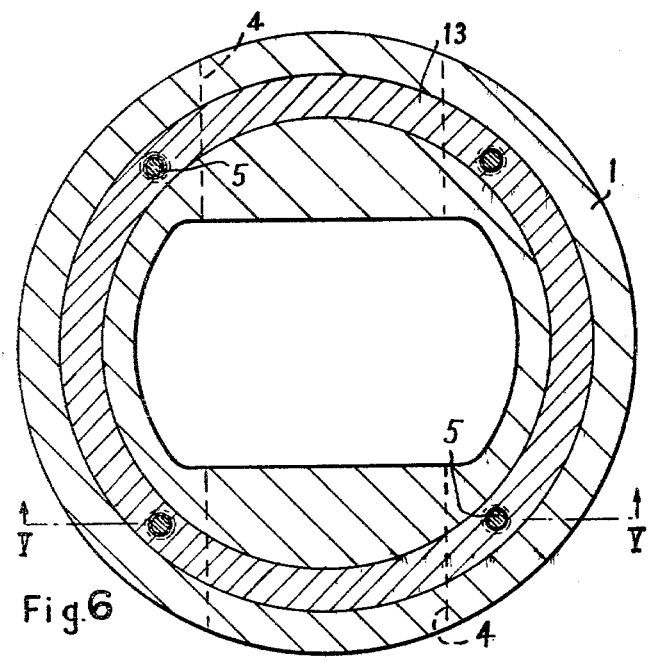
FIG. 6 is a section on the line VI—VI in FIG. 5.

FIGS. 5 and 6 show a further embodiment wherein cast-in bolts 5 are employed similar to those employed in the embodiment of FIG. 1, but in which the upper ends of the bolts are secured to an annular ring 13 embedded in the cast piston material just below the lowermost piston ring groove. Such an arrangement gives greater support to the thrust faces of the piston where fractures may occur resulting from an increased side thrust. As previously, nuts 6 are fitted to the lower threaded ends 5a of the bolts 5 to allow the desired compressive stress to be provided.

It will be appreciated that with the arrangements according to the present invention, by imparting a compressive stress to the cast aluminium in the region of the gudgeon pin bosses, it is possible to lessen the tendency for the formation of cracks resulting from axial tensile forces in the piston.

With the arrangements described, where the reinforcing members are made of steel, any tensile force applied to the cast material of the piston will impart an additional tensile stress to the reinforcing members which is approximately three times that imparted to the aluminium alloy due to the ratio of the elastic modulii. Thus the advantage of initial compressive stress in the aluminium alloy is readily apparent.

Whilst particular embodiments have been described, it will be understood that various modifications may be made without departing from the scope of the invention. Thus the reinforcing members may be made of other materials besides high tensile steel and may be located in other positions in the piston as may be found advantageous.

What is claimed is:

1. A cast light metal piston comprising:

a crown;

a skirt cast integral with and depending from said crown;

two gudgeon pin bosses integral with and provided in said skirt and defining respective gudgeon pin holes;

a plurality of rod-like reinforcing members respectively located adjacent the opposite sides of each of said gudgeon pin holes, and which extend longitudinally relative to the piston axis through the cast material of the piston forming said gudgeon pin bosses;

said reinforcing members being each in the form of a bolt embedded in the cast material of the piston and having an enlarged head at one end and a threaded portion at the other end, said bolt heads being located towards the crown of the piston and embedded in the cast material and said threaded end portions projecting from the cast material at the bottom of the piston, and having nuts fitted onto the said threaded end portions of the bolts, whereby tightening of the nuts imparts a compressive stress in the axial direction to the cast material of the piston on the opposite side regions of said gudgeon pin bosses.

* * * * *